US005568348A

United States Patent [19]
Foreman et al.

[11] Patent Number: 5,568,348
[45] Date of Patent: *Oct. 22, 1996

[54] INSERT DEVICE FOR ELECTRICAL RELAYS, SOLENOIDS, MOTORS, CONTROLLERS, AND THE LIKE

[75] Inventors: Kevin G. Foreman, Sandia Park; Willie C. Kiser, Rio Rancho; Paul J. Miller, Albuquerque, all of N.M.

[73] Assignee: TRW Inc., Redondo Beach, Calif.

[ * ] Notice: The term of this patent shall not extend beyond the expiration date of Pat. No. 5,455,734.

[21] Appl. No.: 520,497

[22] Filed: Aug. 29, 1995

Related U.S. Application Data

[63] Continuation of Ser. No. 87,638, Jul. 1, 1993, Pat. No. 5,455,734, which is a continuation-in-part of Ser. No. 938,111, Aug. 31, 1992, Pat. No. 5,290,191, which is a continuation-in-part of Ser. No. 895,148, Jun. 5, 1992, Pat. No. 5,181,859, which is a continuation of Ser. No. 694,262, Apr. 29, 1991, abandoned.

[51] Int. Cl.$^6$ ............................................... H02H 9/00
[52] U.S. Cl. .............................. 361/118; 361/56; 361/91; 361/111
[58] Field of Search ............................ 361/56, 91, 118, 361/58, 111; 439/225, 98, 608

[56] References Cited

U.S. PATENT DOCUMENTS

| | | | |
|---|---|---|---|
| T947,007 | 6/1975 | Krumreich et al. | 439/225 |
| 2,073,880 | 3/1937 | Robinson | 439/225 |
| 2,385,620 | 9/1945 | Fleckenstein | 177/311 |
| 2,449,150 | 9/1948 | Schnoll | 177/311 |
| 2,760,128 | 8/1956 | Colby | 439/608 |
| 2,944,330 | 7/1960 | Swick | 439/225 |
| 3,072,873 | 1/1963 | Traher | 439/98 |
| 3,086,188 | 4/1963 | Ross | 339/49 |
| 3,231,843 | 1/1966 | Antes et al. | 339/14 |
| 3,234,464 | 2/1966 | Cook | 324/122 |

(List continued on next page.)

FOREIGN PATENT DOCUMENTS

| | | | |
|---|---|---|---|
| 0149907 | 7/1985 | European Pat. Off. | H01R 13/66 |
| 0211508 | 2/1987 | European Pat. Off. | H01R 13/719 |
| 0348562 | 1/1990 | European Pat. Off. | H01R 9/09 |
| 8428300 | 2/1985 | Germany | H01R 29/00 |
| 0246305 | 1/1926 | United Kingdom | H02H 9/00 |

OTHER PUBLICATIONS

U.S. Serial No. 08/394,924, filed Feb. 24, 1995.
U.S. Serial No. 08/417,506, filed Apr. 3, 1995.
Pulse–Guard "The Super ESD Suppressor For I/O Connectors", 4 sheets, date believed to be 2–93 (Ex. G).
G & H Technology, Inc., "Pulse–Guard" literature including Sub–Millimeter model, 10 sheets, date believed to be Aug. 1992 (Ex. D).
Pulse–Guard "Pulse–Guard Model 'PGD' Submillimeter Suppressor Arrays", 2 sheets, date believed to be Oct. 1992 (Ex. F).
Originally filed Patent Application for U.S. Patent No. 4,580,866 to Hagner Archer, "Heavy Duty Spike Protector", (Ex. A).
Pulse–Guard "Transient Overvoltage Protection", 1 p. date believed to be Mar. 1992. (Ex. C).
Hyatt, "A Technique for Optimizing ESD, EMP and Lighting Protection", pp. 393–408, date believed to be fall 1992 (Ex. B).

*Primary Examiner*—Jeffrey A. Gaffin
*Assistant Examiner*—Stephen Jackson
*Attorney, Agent, or Firm*—G. Gregory Schivley; Robert W. Keller

[57] ABSTRACT

An insert device employing electronics is non-intrusively disposed between an electronic mechanism's pins and female connector in order to provide the mechanism with electronic functional capabilities. The insert device is of a shape, size, and character such that normal mating engagement between the mechanism's pins and connector is unaffected.

5 Claims, 5 Drawing Sheets

U.S. PATENT DOCUMENTS

| | | | |
|---|---|---|---|
| 3,271,726 | 9/1966 | Pfendler | 339/49 |
| 3,435,387 | 3/1969 | Reinke et al. | 333/79 |
| 3,500,194 | 3/1970 | Smith | 439/608 |
| 3,569,915 | 3/1971 | Langham et al. | 439/608 |
| 3,670,292 | 6/1972 | Tracy | 439/608 |
| 3,718,859 | 2/1973 | Arlow | 324/725 |
| 3,736,379 | 5/1973 | Kagan | 439/225 |
| 3,740,701 | 6/1973 | Harnden, Jr. | 338/220 |
| 3,753,261 | 8/1973 | Thaxton | 439/490 |
| 3,790,858 | 2/1974 | Brancaleone et al. | 317/99 |
| 3,821,686 | 6/1974 | Harnden, Jr. | 439/225 |
| 3,825,874 | 7/1974 | Peverill | 439/579 |
| 3,852,700 | 12/1974 | Haws | 439/98 |
| 3,905,013 | 9/1975 | Lee | 340/457 |
| 4,002,397 | 1/1977 | Wang et al. | 439/225 |
| 4,029,386 | 6/1977 | Krantz, Jr. et al. | 339/143 |
| 4,056,299 | 11/1977 | Paige | 439/439 |
| 4,082,394 | 4/1978 | Gedney et al. | 361/405 |
| 4,089,032 | 5/1979 | Dell Orfano | 361/56 |
| 4,326,765 | 4/1982 | Brancaleone | 439/69 |
| 4,330,166 | 5/1982 | Cooper et al. | 439/609 |
| 4,362,350 | 12/1982 | von Harz | 439/608 |
| 4,407,552 | 10/1983 | Watanabe et al. | 339/143 R |
| 4,415,218 | 11/1983 | McKenzie | 439/890 |
| 4,440,463 | 4/1984 | Gliha, Jr. et al. | 439/92 |
| 4,522,455 | 6/1985 | Johnson | 339/14 |
| 4,580,866 | 4/1986 | Hagner | 439/620 |
| 4,673,237 | 6/1987 | Wadsworth | 439/607 |
| 4,676,564 | 6/1987 | Mitchell, Jr. | 439/225 |
| 4,709,253 | 11/1987 | Walters | 257/603 |
| 4,717,349 | 1/1988 | Johnson | 439/105 |
| 4,726,638 | 2/1988 | Farrar et al. | 439/620 |
| 4,729,743 | 3/1988 | Farrar et al. | 439/276 |
| 4,729,752 | 3/1988 | Dawson, Jr. et al. | 439/620 |
| 4,813,891 | 3/1989 | Walters et al. | 439/620 |
| 4,820,174 | 4/1989 | Farrar et al. | 439/95 |
| 4,846,705 | 7/1989 | Brunnenmeyer | 439/78 |
| 4,930,200 | 6/1990 | Brush, Jr. et al. | 29/25.42 |
| 4,979,070 | 12/1990 | Bodkin | 361/42 |
| 4,979,904 | 12/1990 | Francis | 439/108 |
| 4,992,061 | 2/1991 | Brush, Jr. et al. | 439/620 |
| 4,992,333 | 2/1991 | Hyatt | 428/329 |
| 5,092,788 | 3/1992 | Pristupa, Jr. et al. | 439/225 |
| 5,118,302 | 6/1992 | Fussell et al. | 439/225 |
| 5,134,252 | 7/1992 | Himeno et al. | 174/268 |
| 5,149,274 | 9/1992 | Gallusser et al. | 439/76 |
| 5,153,540 | 10/1992 | Gliha, Jr. | 333/182 |
| 5,181,859 | 1/1993 | Foreman et al. | 439/225 |
| 5,183,698 | 2/1993 | Stephenson et al. | 428/209 |
| 5,257,950 | 11/1993 | Lenker et al. | 439/620 |
| 5,290,191 | 3/1994 | Foreman et al. | 439/225 |
| 5,387,131 | 2/1995 | Foreman et al. | 439/225 |
| 5,414,587 | 5/1995 | Kiser et al. | 439/225 |
| 5,428,288 | 6/1995 | Foreman et al. | 439/225 |
| 5,455,734 | 10/1995 | Foreman et al. | 439/225 |

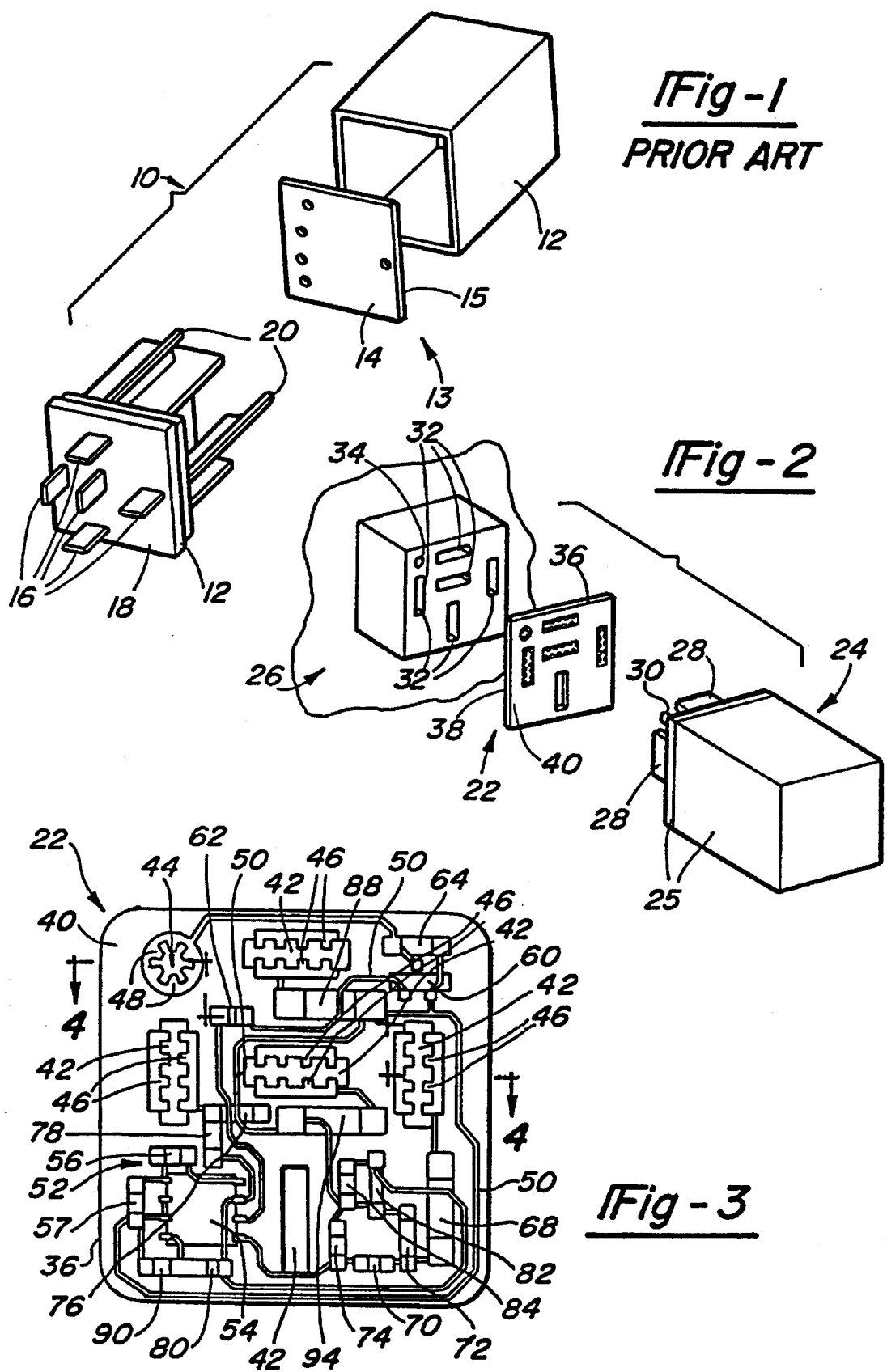

INSERT DEVICE FOR ELECTRICAL RELAYS, SOLENOIDS, MOTORS, CONTROLLERS, AND THE LIKE

CROSS-REFERENCE TO RELATED APPLICATIONS

This is a continuation of U.S. patent application Ser. No. 087,638 filed Jul. 1, 1993, now U.S. Pat. No. 5,455,734 which is a continuation-in-part of Ser. No. 938,111, filed Aug. 31, 1992, now U.S. Pat. No. 5,290,191, issued Mar. 1, 1994, which is a continuation-in-part of Ser. No. 895,148, filed Jun. 5, 1992, now U.S. Pat. No. 5,181,859 issued Jan. 26, 1993, which is a continuation of Ser. No. 694,262, filed Apr. 29, 1991, now abandoned.

BACKGROUND OF THE INVENTION

1. Technical Field

This invention relates to electrical components, and more particularly, to a device for selectively making electrical connection to a plurality of pins of a relay, solenoid, motor, or the like.

2. Discussion of the Related Art

Various commercial and industrial relay applications require the use of relays having the capability of accomplishing functions such as timing, transient surge protection, or other functions requiring electronics. Relays having such electronic functional capabilities are commonly referred to as "smart" relays as opposed to off-the-shelf "simple" electronic functional-free relays.

Currently, prior art "smart" relays often include a printed circuit board housed within the relay's exterior casing. Unfortunately, the prior art "smart" relays require larger profiles than "simple" relays in order to receive and house the printed circuit boards. Because of space constraints within a "smart" relay's casing, the relay's printed circuit board often employs electronics on both of its surfaces. The prior art printed circuit boards are commonly hand soldered to mechanical tie down points located within a "smart" relay's casing. The external male connector pins of a prior art "smart" relay, which mate with a female relay connector, must be extended within the relay's casing in order to make connection with the housed printed circuit board. When compared to the production of a "simple" relay, securing a prior art "smart" relay's printed circuit board within the casing and coupling the printed circuit board to the external male connector pins is an inefficient process with relatively high production costs and time requirements. Also, in order to upgrade, test, or replace a prior art "smart" relay's printed circuit board, the entire relay assembly including the casing must be removed and disassembler.

Thus, it would be desirable to produce a relay insert device which provides an off-the-shelf "simple" relay with the capabilities of a "smart" relay when inserted over the relay's external male connector pins. The circuitry of such a relay insert device would optimally be located within a perimeter substantially corresponding to the perimeter of the relay's exterior casing and would provide electronic functions with minimal or no alterations to an existing off-the-shelf "simple" relay. Further, it would be desirable to provide a technique for providing a "simple" relay with electronic functional capabilities in a cost effective and an efficient manner.

Similar problems are encountered with automotive electrical systems where a central computer is used to electronically activate a vehicle's mechanisms such as, but not limited to, solenoids, motors, controllers, and relays. These mechanisms in turn control the actuation of the vehicle's various assemblies such as, but not limited to, door lock and window assemblies. Currently, prior art automotive electrical systems require the use of various electronic modules and a harness consisting of a large number of wires extending throughout the vehicle for controlling the vehicle's electronically activated mechanisms. Commonly, such systems include one harness control wire for each mechanism to be activated. The use of a prior art system having a multiple control wire harness in conjunction with electronic modules adds weight and cost to a vehicle. Thus, it would be desirable to produce an addressable interface insert device which would eliminate the need for a multiple control wire harness when inserted between a vehicle's electronically activated mechanisms and a single control wire bus network which carries address signals from a central computer. Further, it would be desirable to provide a method for selectively activating electronically activated mechanisms coupled by a single control wire to a central computer of a bus network.

SUMMARY OF THE INVENTION

Pursuant to one embodiment of the present invention, an insert device with electronic circuitry capable of interfacing with an unaltered off-the-shelf "simple" relay is disclosed. In addition, a technique for efficiently and effectively providing a "simple" relay with electronic functional capabilities is also taught. The device is disposed in the normally wasted space between the "simple" relay and a female relay connector, and the device's outer perimeter is substantially coextensive with the exterior surface area of the "simple" relay's casing. The device causes minimal mechanical intrusion and requires minimal installation time compared to existing means of providing for a "smart" relay. Once installed, the relay insert device is virtually non-intrusive; there is no observable change in the mechanical configuration of the "simple" relay assembly. The relay insert device can be totally passive; in order to function, it requires no batteries or electrical power. However, the device can use power from the relay's pins passing through the device if desirable for a specific application. In addition, a technique for efficiently and effectively providing a "simple" relay with electronic functional capabilities is also taught.

In accordance with the teachings of a preferred embodiment of this invention, a device is provided for use with a "simple" relay having a plurality of male connector pins which mate with sockets in a female relay connector. The device provides the "simple" relay with electronic functional capability and includes a substrate having holes aligned with the pins of the "simple" relay such that the device may be inserted onto the "simple" relay. The substrate is sufficiently thin so that the device fits non-intrusively between the "simple" relay and the female relay connector during normal mating engagement between the pins and the female connector. When the pins extend through the holes in the substrate, electrically conductive bendable fingers, affixed to the device, contact selected pins of the relay. The conductive bendable fingers are in turn coupled to various electrical components positioned on the substrate by an electrical conductor pattern formed on the substrate's surface.

In a preferred embodiment, the device provides the "simple" relay with a timing function and has a perimeter such that all of the device's circuitry is contained within the perimeter of the relay's casing.

In accordance with a second embodiment of the invention, the insert device further includes a conductive plate which is coupled to a ground pin of the "simple" relay and the device's electronics. In a preferred embodiment, the device provides transient surge protection for the "simple" relay.

In accordance with a third embodiment of the invention, an insert device is provided for interfacing with an electronically activated mechanism having a plurality of male connector pins which mate with sockets in a female connector and which is activated in response to an address signal. In a preferred embodiment, the device includes a substrate having holes aligned with the pins of the mechanism such that the substrate is insertable over the pins. The substrate is sufficiently thin so that the device fits non-intrusively between the mechanism and the female connector during normal mating engagement between the mechanism and the connector. The sidewalls defining the holes in the substrate are covered with a conductive material for making contact with selected pins of the mechanism. A conductive material on the substrate forms a path to an electrical component positioned on the substrate. The electrical component decodes the address signal for selectively activating the mechanism in response to a predetermined address.

BRIEF DESCRIPTION OF THE DRAWINGS

The various advantages of the present invention will become apparent to those skilled in the art after reading the following specifications and by reference to the drawings in which:

FIG. 1 is an exploded isometric view of a prior art "smart" relay having a printed circuit board disposed within the relay's casing;

FIG. 2 is an exploded isometric view of the relay insert-device positioned between a "simple" relay and a female relay connector in accordance with the present invention;

FIG. 3 is an end view of the relay insert device of FIG. 2 in accordance with the present invention;

DETAILED DESCRIPTION OF THE PREFERRED EMBODIMENTS

Figure 4:
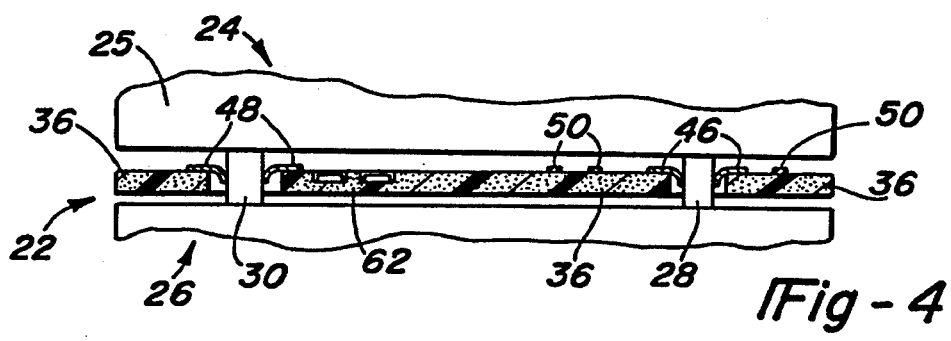
FIG. 4 is a cross-sectional view, taken along lines 4—4 of FIG. 3, in accordance with the present invention.

The following description of the preferred embodiments is merely exemplary in nature and is in no way intended to limit the invention or its application or uses. Additional embodiments will also come to mind by reference to the aforementioned U.S. Ser. No. 998,333, which is hereby incorporated by reference.

The present invention discloses a device which is inserted between various types of mechanisms which receive electrical signals along male pins and corresponding female connectors. When inserted between such a mechanism and a female connector, the device provides preselected electronic functions on the electrical signals carried by the male pins. These functions include, but are not limited to, timing, transient voltage noise suppression, and address decoding. The device comprises a substrate having holes aligned with the pins of a mechanism and is sufficiently thin so as to allow substantially normal mating engagement between the pins and the female connector. Various electronics such as, but not limited to, capacitors, metal oxide varistors, diodes, resistors, transistors, analog and digital components, address decoders, and integrated circuits are incorporated on the substrate in a variety of locations. When inserted in the normally wasted space between the mechanism and the female connector, the device's electronics are substantially located within the surface area of the mechanism's exterior casing. Conductive trace patterns on the substrate interconnect the various electronics according to the desired electronic function that the device is to provide. Contact members formed as, but not limited to, bendable fingers or solder disposed in the side walls defining the holes of the substrate contact selected pins of the mechanism when the device is inserted onto the pins. The various electronics are coupled to the selected pins through these contact members.

Also disclosed, is an efficient process for performing a preselected electronic function on the signals flowing between a mechanism and its corresponding female connector. First turning to FIG. 1, there is shown an exploded isometric view of a typical prior art "smart" relay 10 having casing 12 and printed circuit board 13. Relay 10 includes a plurality of male connector pins 16 which extend through relay front face 18 of casing 12 through to mechanical tie points 20. Casing 12 is of sufficient size to house printed circuit board 13. Because of space constraints within casing 12, printed circuit board 14 has circuitry on surface 14 and surface 15. Printed circuit board 14 is laboriously hand placed and soldered within casing 12.

In accordance with a first embodiment of the present invention, FIG. 2 is an exploded isometric view of relay insert device 22 positioned between "simple" relay 24 and female relay connector 26. Relay 24 includes casing 25, male electrical connector pins 28, and coil feed through pin 30 which is coupled to the coil of relay 24. Female relay connector 26 includes female connector pin sockets 32 and coil pin socket 34. Relay insert device 22 includes substrate 36 having opposing major surfaces 38 and 40. Substrate 36 is formed from a dielectric printed circuit board material but can also be formed from semiconductor or any other suitable material for use in electronic applications.

FIG. 3 is an end view of relay insert device 22 including pin holes 42, extending from major surface 40 through to major surface 38, for receiving electrical connector pins 28.

Pin holes 42 correspond to female connector pin sockets 32. Also included is pin hole 44, extending from major surface 40 through to major surface 38, for receiving coil feed through pin 30. Pin hole 44 corresponds to coil pin socket 34. As is apparent to one skilled in the art, pin holes 42 and pin hole 44 are aligned and shaped such that pins 28 and pin 30 extend through relay insert device 22 when simple relay 24 is mated with female relay connector 26. It should be noted that the number and configuration of the holes within relay insert device 22 are used by way of example and may be varied according to a specific application while remaining within the scope of the present invention. Electrically conductive bendable fingers 46, affixed to major surface 40, extend partially into pin holes 42 for making connection with a number of selected electrical connector pins 28 when relay insert device 22 is inserted onto relay 24. In the same manner, electrically conductive bendable fingers 48, affixed to major surface 40, extend partially into pin hole 44 for making contact with coil feed through pin 30. As pins 28 and pin 30 extend through respective holes 42 and hole 44, fingers 46 and 48 bend under the force of the pins being inserted through the holes thereby providing a sliding, removable, yet positive electrical connection with each respective pin. The amount, shape, and size of fingers 46 and 48 can be varied while remaining within the scope of the present invention. As shown in FIG. 3, one or more of electrical connector pins 28 and/or coil feed through pin 30 can be electrically isolated from relay insert device 22 through the absence of placing conductive bendable fingers around a corresponding hole within substrate 36. Electrically conductive bendable fingers 46 and 48 are connected by way of electrical conductor pattern 50 to circuitry 52 formed in surface 40 of substrate 36.

FIG. 4 is a cross-sectional view, taken along lines 4—4 of FIG. 3, illustrating relay insert device 22 inserted between mated simple relay 24 and female relay connector 26. Relay insert device 22 is sufficiently thin so as to fit between simple relay 24 and female relay connector 26 while permitting substantially normal mating engagement therebetween. Also, the perimeter of substrate 36 is substantially located within the external surface area of casing 25 of simple relay 24.

Figure 5:
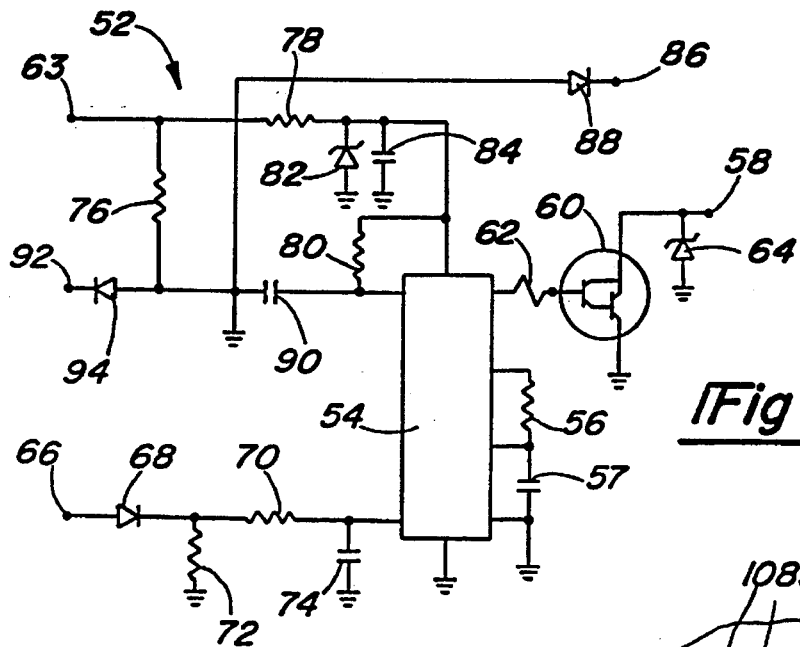
FIG. 5 is a schematic drawing of the exemplary circuitry of the insert device of FIG. 3.

FIG. 5 is a schematic drawing of circuitry 52 which provides a common and well known timing function for simple relay 24 when used in conjunction with, but not limited to, automobile lighting applications. Such an application may keep an automobile's head lights on for a specific time period after the ignition has been turned off or may keep the courtesy lights inside the automobile ion for a set time after the entry system has been activated. Circuitry 52 includes integrated circuit 54 that performs a simple timing function. Integrated circuit 54 is a TRW-WICKES (Part#3182010) application specific integrated circuit that receives an input pulse and returns an output pulse on the order of 35 seconds later, and this integrated circuit also has an Override input that when triggered, triggers the output instantly. It should be noted that integrated circuit 54 can be substituted with other circuitry while remaining within the scope of the present invention. Resistor 56 and capacitor 57 provided a time constant for integrated circuit 54 which can be varied according to a specific application. Coil pin 30 of relay 24, coupled to node 58 by fingers 48, is coupled to integrated circuit 54 by darlington transistor 60 and resistor 62. Zener diode 64, connected between node 58 and ground, provides surge protection. One of pins 28 of relay 24 serving as an ignition switch pin is coupled by fingers 46 to node 66 and to integrated circuit 54 by diode 68, a divider consisting of resistor 70 and resistor 72, and a coupling capacitor 74. Another one of pins 28 serving as a power pin, coupled to node 63 by fingers 46, is coupled to integrated circuit 54 by a divider consisting of resistors 76, 78, and 80. Zener diode 82 and capacitor 84, both coupled to ground, provide surge and noise protection for integrated circuit 54. A lamp pin, selected from pins 28 and coupled to node 86 by fingers 46, is coupled to integrated circuit 54 by diode 88 and capacitor 90. A keyless entry pin of relay 24, selected from pins 28 and coupled to node 92 by fingers 46, is coupled to integrated circuit 54 by diode 94 and capacitor 90. Integrated circuit 54 controls the triggering of transistor 60 in order to control the excitation of the coil of relay 24. Relay 24 in turn controls the flow of power to a lamp coupled to the lamp pin of relay 24. Other components having different characteristics can be added to or used in place of the components of circuitry 50 while remaining within the scope of the present invention.

Figure 6:
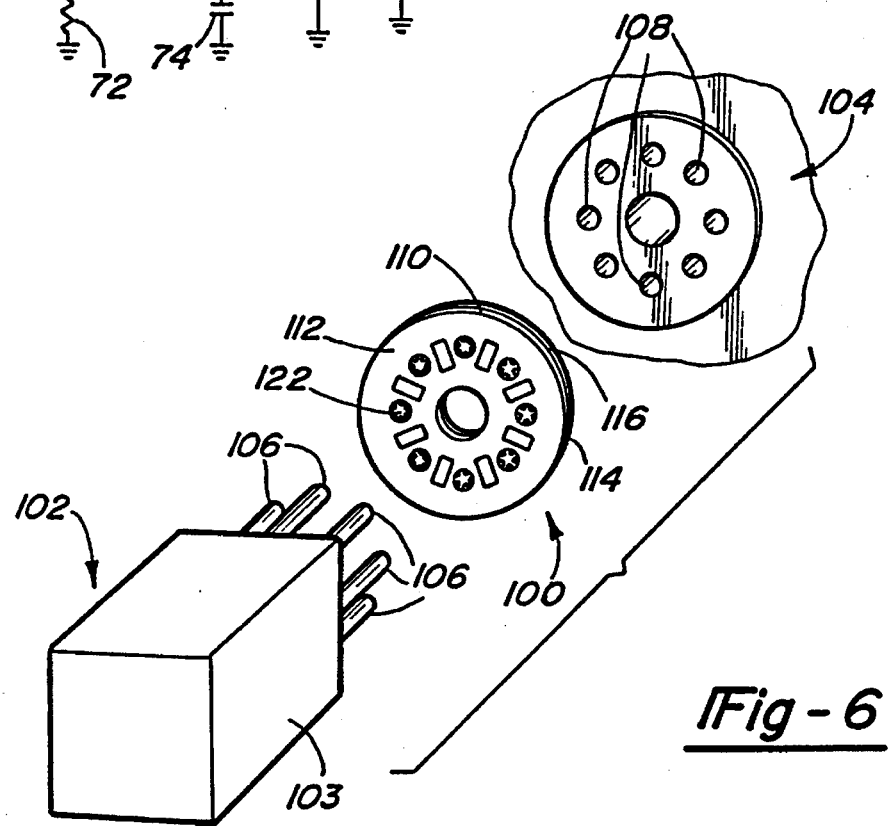
FIG. 6 is an exploded isometric view of the relay insert device positioned between a "simple" relay and a female relay connector in accordance with a second embodiment of the present invention.

In accordance with a second embodiment of the present invention, FIG. 6 is an exploded isometric view of relay insert device 100 positioned between "simple" relay 102 and female relay connector 104. Relay 102 includes casing 103 and male electrical connector pins 106 that mate female connector pin sockets 108 of female relay connector 104. Relay insert device 100 includes substrate 110 having opposing faces 112 and 114. Substrate 110 is formed from an insulating material such as, but not limited to, G-10 or Kapton. Conductive plate 116 is affixed to and substantially coextensive with face 114. Conductive plate 116 is formed from a conductive material such as, but not limited to, a gold-plated beryllium-copper (Be—Cu) alloy.

Figure 7:
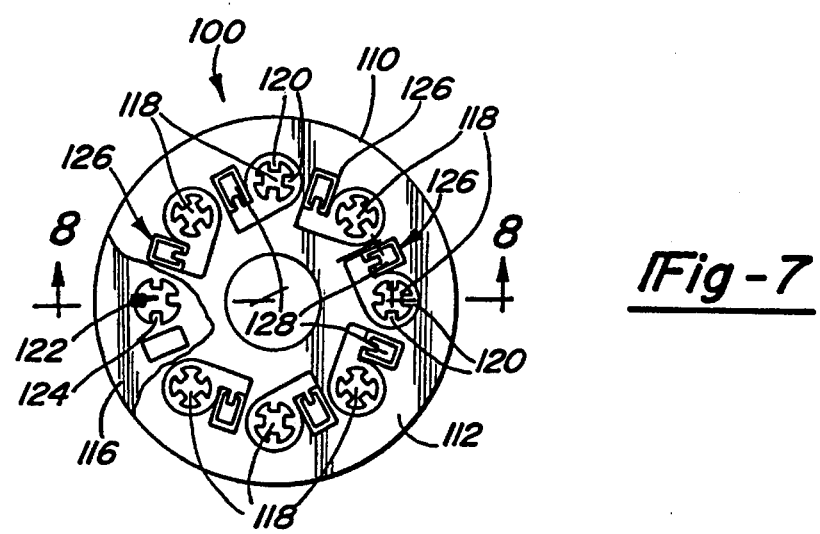
FIG. 7 is a partial cutaway end view of the relay insert device of FIG. 6 in accordance with the present invention.

FIG. 7 is an end view of relay insert device 100 with a portion of substrate 110 partially cut away for illustration of conductive plate 116. Relay insert device 100 includes pin holes 118, extending from face 112 through conductive plate 116, for receiving electrical connector pins 106. Pin holes 118 correspond to female connector pin sockets 108. Also included within relay insert 100, is ground pin hole 122, extending from face 112 through conductive plate 116, for receiving ground pin 106' serving as ground for relay 102. As is apparent to one skilled in the art, pin holes 118 and pin hole 122 are aligned such that pins 106 and pin 106' extend through relay insert device 100 when relay 102 is mated with female relay connector 104. It should be noted that the number and configuration of the holes within relay insert device 100 are used by way of example and may be varied according to a specific application while remaining within the scope of the present invention. Electrically conductive bendable fingers 120, affixed to face 112, extend partially into pin holes 118 for making connection with electrical connector pins 106 when relay insert device 100 is inserted onto relay 102. Electrically conductive bendable ground fingers 124 are formed from conductive plate 116 and extend partially into ground pin hole 122 for making connection with ground pin 106' when relay insert device 100 is inserted onto relay 102. It is important to note that ground pin hole 122 is not surrounded by electrically conductive bendable fingers 120 (See FIG. 6). As pins 106 and pin 106' extend through respective holes 118 and 122, fingers 120 and 124 bend under the force of the pins being inserted through the holes thereby providing a sliding, removable, yet positive electrical connection with each respective pin. As is apparent to one skilled in the art, one or more of electrical connector pins 106 can be electrically isolated from relay insert device 100 through the absence of placing conductive bendable fingers around a corresponding hole within substrate 110 and conductive plate 116. Relay insert device 100 further comprises component holes 126, extending from face 112 through to face 114 and through conductive plate 116, for receiving capacitors 128. Capacitors 128 make connection with electrically conductive bendable fingers 120 and conductive plate 116. By way of some non-limiting examples, capacitors 128 can be replaced with metal oxide varistors, diodes, integrated circuits such as timers or bus interface units, or any other electrical components capable of coupling or blocking signals carried by pins 106.

Figure 8:
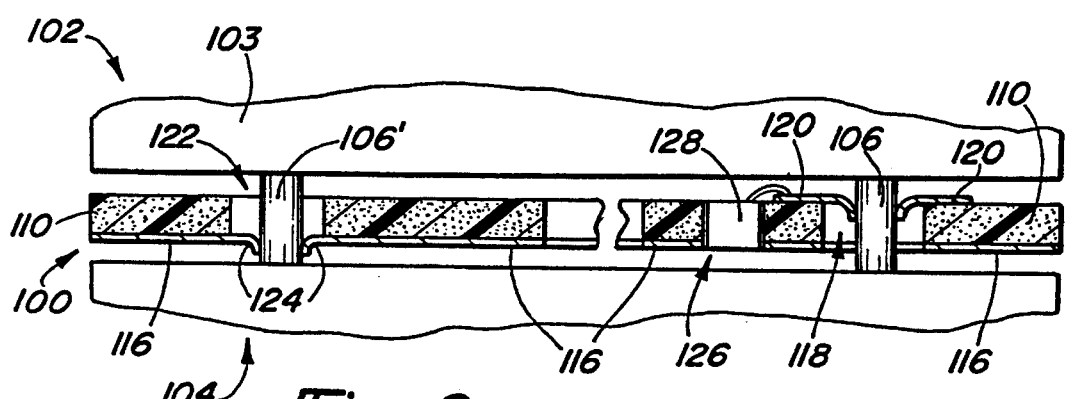
FIG. 8 is a cross-sectional view, taken along lines 8—8 of FIG. 7, in accordance with the present invention.

FIG. 8 is a cross-sectional view taken along lines 8—8 of FIG. 7, which illustrates relay insert device 100 disposed between simple relay 102 and female relay connector 104. Pins 106 extend through pin holes 118 thereby making positive electrical connection with electrically conductive bendable fingers 120. At the same time, ground pin 106' extends through ground pin hole 122 remaining isolated from substrate 110 but makes connection with ground fingers 124. Relay insert device 100 has a perimeter which is substantially located within the surface area of casing 103 of simple relay 102 and is sufficiently thin to permit substantially uninhibited mating connection between relay 102 and female relay connector 104. When relay insert device 100 is positioned between mated simple relay 102 and female connector 104, pins 106 are coupled to ground pin 106' by fingers 120, capacitors 128, ground plate 116, and ground fingers 124. This arrangement protects simple relay 102 by coupling select voltages from pins 106 to ground pin 106'.

Figure 9:
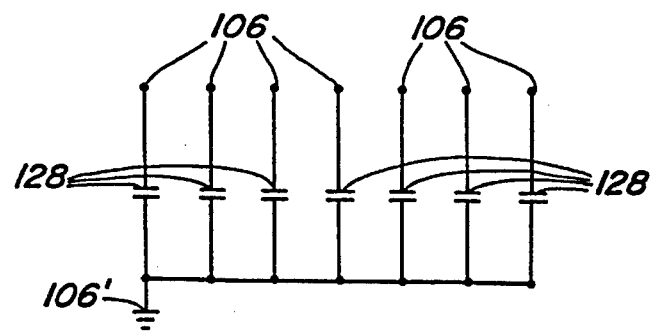
FIG. 9 is a schematic drawing of the exemplary circuitry of the relay insert device of FIG. 7 in accordance with the present invention.

FIG. 9 is a schematic drawing of relay insert device 100 illustrating pins 106, coupled to ground pin 106' through capacitors 128. As is apparent to one skilled in the art, this provides transient voltage noise suppression for relay 102.

Figure 10:
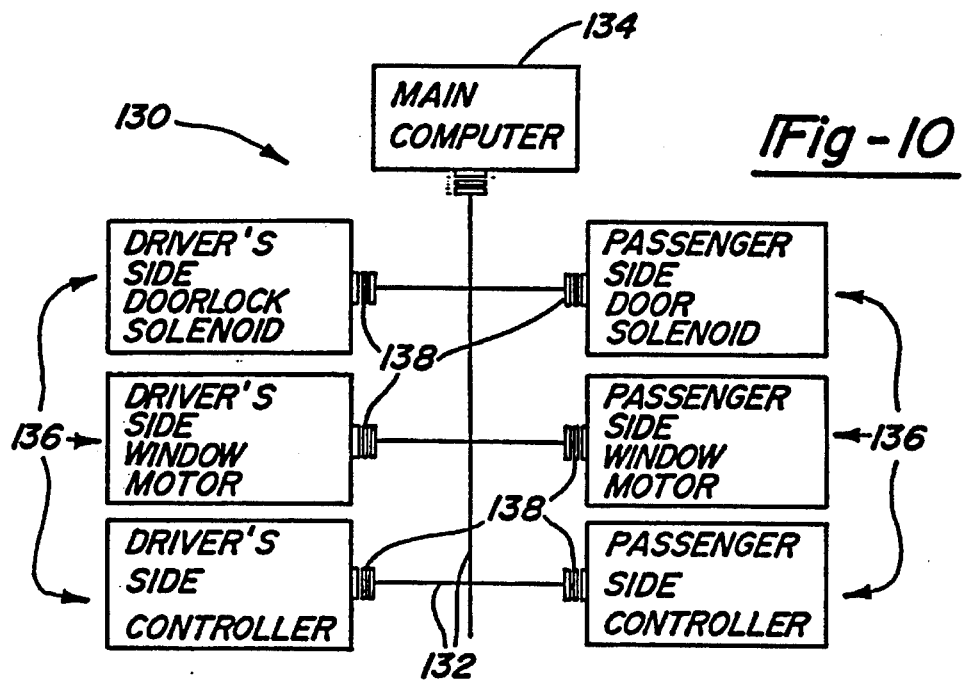
FIG. 10 is a block diagram of an exemplary automotive bus network employing a plurality of the insert devices in accordance with the present invention.

In accordance with a third embodiment of the present invention, FIG. 10 is a block diagram of an exemplary automotive bus network 130 including a single control wire 132 extending throughout a vehicle. Main computer 134 sends address signals which are carried by control wire 132 to the vehicle's various electronically activated mechanisms 136. Addressable interface insert devices 138 are disposed between control wire 132 and mechanisms 136 for the purpose of decoding the address signals sent by main computer 134 in order to determine if a respective address was sent by main computer 134 for selectively activating the respective mechanism 136. While the general physical characteristics of each device 138 are the same, each one carries differently programmed integrated circuit devices that recognize and respond only when its associated address is transmitted over the bus.

Figure 11:
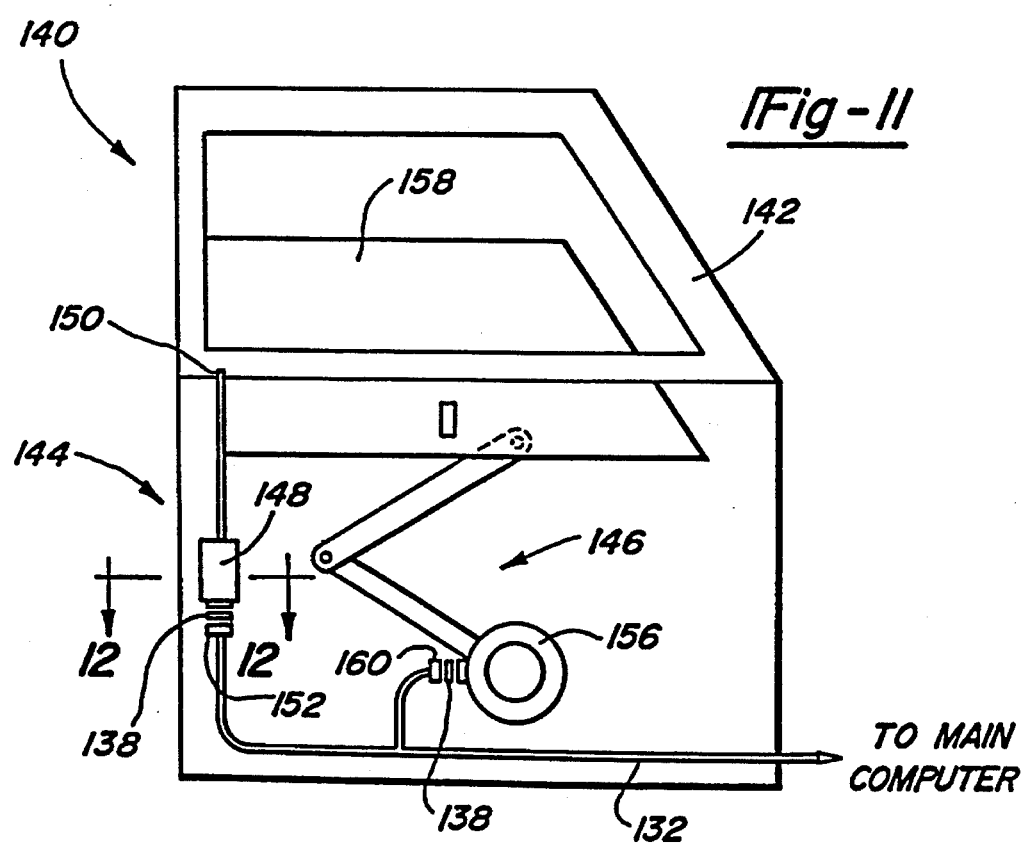
FIG. 11 is a partial cut-away side view of an exemplary automotive door application employing a plurality of the insert devices in accordance with the present invention.

Next turning to FIG. 11, there is shown a partial cut away side view of an exemplary automobile door application employing addressable insert devices 138. Automobile door 142 includes door lock assembly 144 and window motor assembly 146. Door lock assembly 144 includes door lock solenoid 148, lock mechanism 150, and female connector 152. Window motor assembly 146 includes window motor 156, window 158, and female connector 160. Door lock assembly 144 is actuated by door lock solenoid 148, and window motor assembly 146 is actuated by window motor 156. Devices 138 are disposed between female connectors 152 and 160, which are coupled to main computer 134 through control wire 132, and door lock solenoid 148 and window motor 156, respectively. Devices 138 decode the address signals carried by control wire 132 in order to determine if a respective address was sent by main computer 134 for selectively activating door lock solenoid 148 or window motor 156. It should be noted that devices 138 can be employed in conjunction with the other vehicle assemblies that are activated by electrical signals while remaining within the scope of the present invention.

Figure 12:
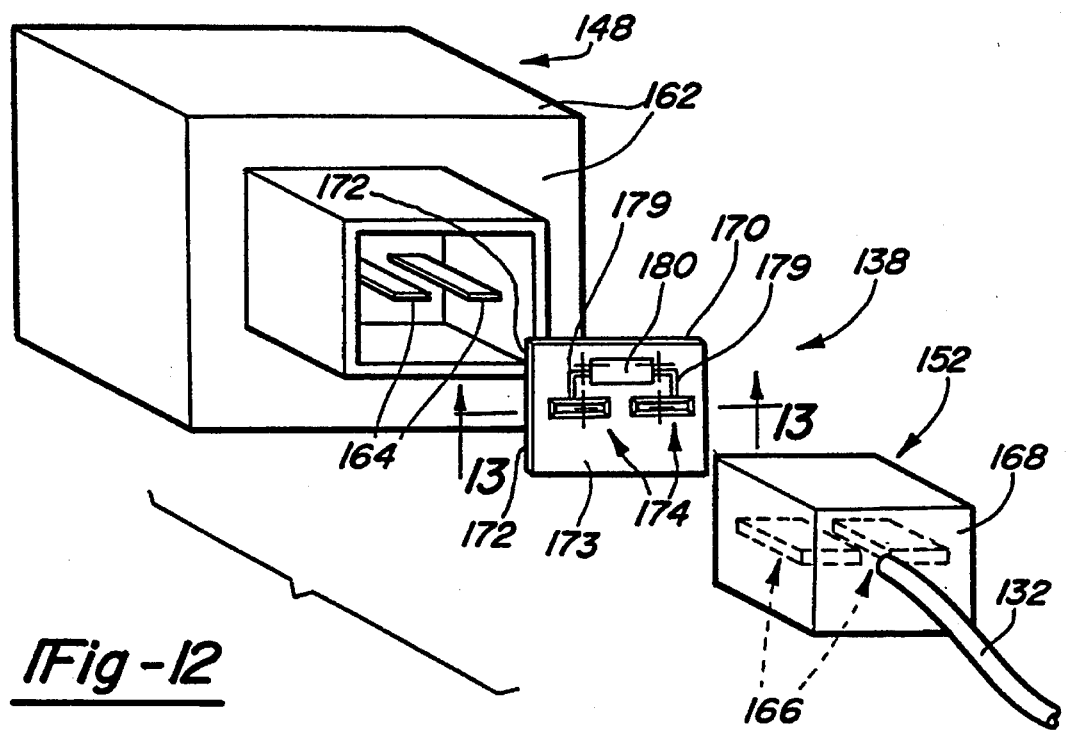
FIG. 12 is an exploded isometric view, taken along lines 12—12 of FIG. 11, in accordance with the present invention.

FIG. 12 is an exploded isometric view, taken along lines 12—12 of FIG. 11 with addressable interface insert device 138 positioned between door lock solenoid 148 and female connector 152. Door lock solenoid 148 includes casing 162 and male electrical connector pins 164. Female connector 152 includes female connector pin sockets 166 surrounded by casing 168 and is coupled to control wire 132. Device 138 includes substrate 170 having opposing major surfaces 172 and 173. Substrate 170 is formed from a dielectric printed circuit board material but can also be formed from semiconductor or any other suitable material for use in electronic applications. Interface device 138 includes pin holes 174, extending from major surface 172 through to major surface 173, for receiving connector pins 164. Pin holes 174 correspond to female connector pin sockets 166. As is apparent to one skilled in the art, pin holes 174 are aligned and shaped such that pins 164 extend through device 138 when female connector 152 is mated with door lock solenoid 148. It should be noted that the number and configuration of pin holes 174 are used by way of example and may be varied according to a specific application while remaining within the scope of the present invention.

Figure 13:
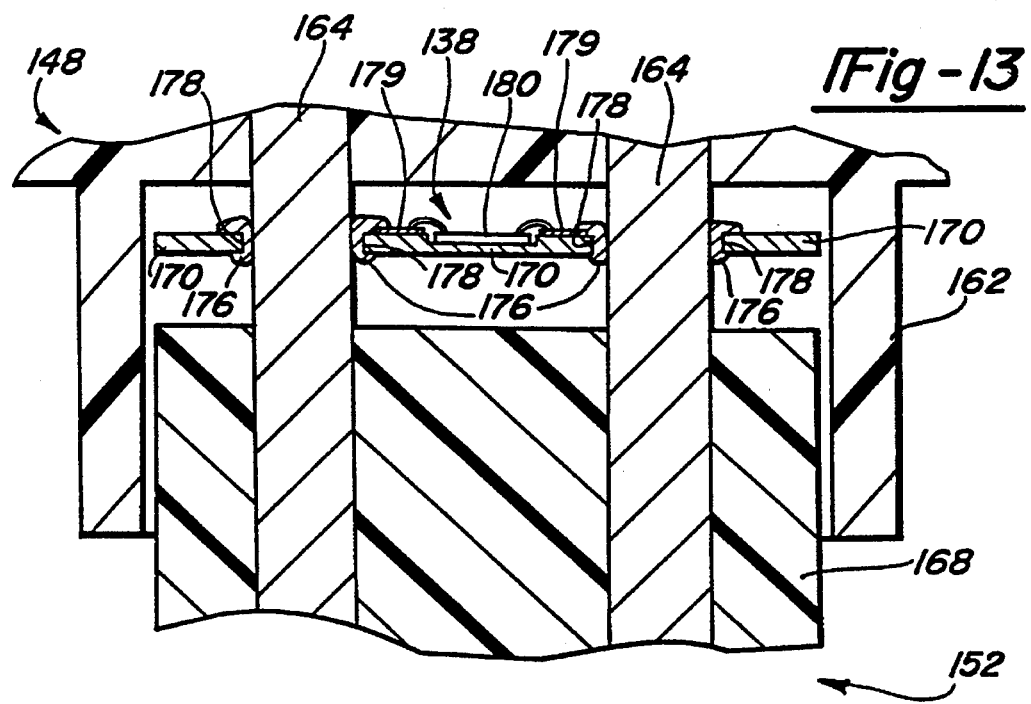
FIG. 13 is a cross-sectional view, taken along lines 13—13 of FIG. 12, in accordance with the present invention.

FIG. 13 is a cross sectional view, taken along lines 13—13 of FIG. 12, illustrating addressable interface insert device 138 inserted between mated door lock solenoid 148 and female connector 152. Device 138 is sufficiently thin so as to fit between door lock solenoid 148 and female connector 152 while permitting substantially normal mating engagement therebetween. Also, the perimeter of substrate 170 is substantially located within the external surface area of casing 162 and 168. Electrically conductive material 176, such as solder, is disposed in side walls 178 of pin holes 174 for making a sliding, removable, yet positive electrical connection with pins 164 when interface device 138 is inserted onto pins 164 of door lock solenoid 148. As is apparent to one skilled in the art, one or more of pins 164 can be electrically isolated from interface device 138 through the absence of depositing electrically conductive material 176 within corresponding side walls 178 of one of holes 174 of substrate 170. Electrically conductive material 176 is connected by way of electrical conductor pattern 179 to integrated circuit 180 formed on surface 173 of substrate 170. In accordance with automotive door application 140, integrated circuit 180 provides address decoding for the address signals sent by main computer 134 along control wire 132 and, in turn, pins 164. Other circuitry having different characteristics can be added to or used in place of integrated circuit 180 while remaining within the scope of the present invention. In operation, insert device 138 functions to determine if a predetermined address corresponding to door lock solenoid 148 has been sent by main computer 134 along control wire 132 in order to selectively activate door lock solenoid 148.

From the foregoing it can be seen that the use of relay insert device 22 and 100 for providing "simple" relays 24 and 102 with electronic functional capabilities has several useful consequences. Compared to a prior art "smart" relay having a printed circuit board disposed within the relay's casing, the use of the relay insert device provides an efficient technique for providing a "simple" relay with electronic functional capabilities with minimal mechanical intrusion, minimal installation and assembly times and costs, and with minimal or no alterations to the relay. Use of the relay insert device is also advantageous in that the electronics can be upgraded, tested, or replaced simply by disconnecting the relay from the female connector and removing the device from the relay. Of course, the teachings of the present invention can be employed to produce a relay insert device which provides additional and different electronic functions for relays, and the relay insert devices can be made with variations in the materials used.

In addition it can be seen that the use of addressable interface insert devices 138 within a single control wire bus network of an automobile has several useful consequences. Compared to prior art multiple control wire harnesses, the use of an addressable interface insert device reduces the required number of wires needed for controllably activating the mechanisms throughout a vehicle which, in turn, reduces costs and weight.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the present invention as defined by the following claims.

What is claimed is:

1. A device for making electrical connection to at least one pin of a plurality of pins in a male connector which mates with sockets in a female connector, comprising:

a structure being sufficiently thin so as to fit between said male connector and said female connector while permitting mating engagement therebetween, said structure having holes therein substantially aligned with said pins of said male connector, said structure being insertable over said pins such that said pins extend through the holes;

electrical component means disposed within said structure; and contact means for contacting at least one of said pins when said pins extend through the holes in said structure and said electrical component means, whereby said device is inserted onto the male connector for performing a preselected function on at least one signal carried by the pins thereof mated with the female receptacle.

2. The device of claim 1, wherein said electrical component means includes at least one capacitor.

3. A method of performing a preselected function on at least one electrical signal flowing between at least one of a plurality of pins of a male connector which mates with sockets in a female connector, said method comprising the steps of:

providing a substrate having a series of holes therein substantially corresponding to said pins of said male connector;

disposing an electrical component within said substrate for performing the preselected function on the signal;

providing a conductive path between at least one of the holes and said electrical component;

inserting said substrate onto said male connector such that said pins extend through the corresponding holes in said substrate and make electrical connection with said electrical component through said conductive path; and mating said male connector and said female connector together, with said substrate disposed therebetween.

4. The method of claim 3 wherein said preselected function provides suppression of selected voltages carried by at least one of said pins.

5. The method of claim 3 wherein said electrical component means includes at least one capacitor.

* * * * *